(No Model.) 7 Sheets—Sheet 1.
J. C. STEVENS.
AUTOMATIC VENDING MACHINE.
No. 412,993. Patented Oct. 15, 1889.
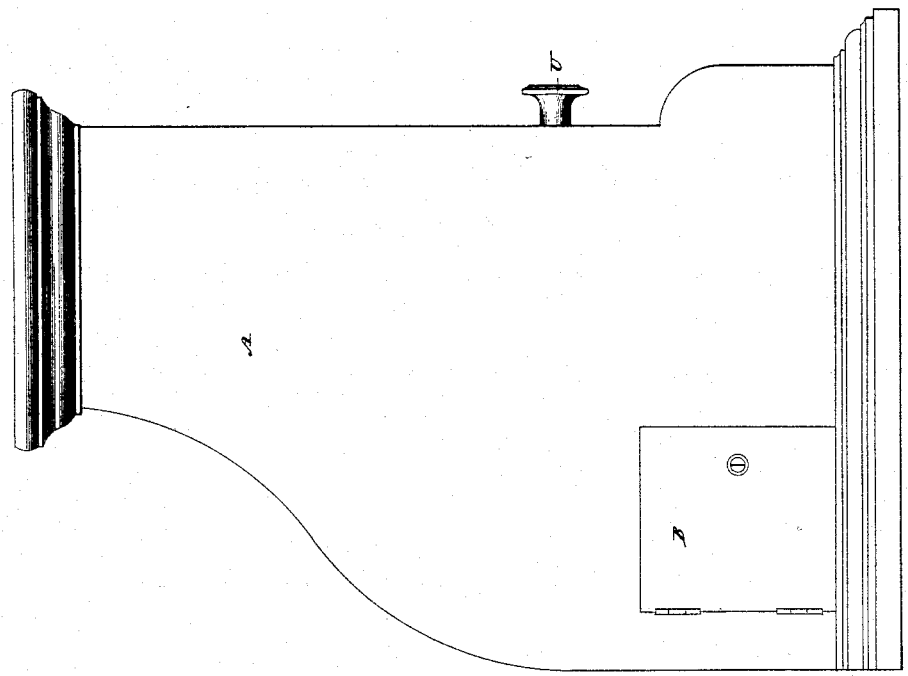
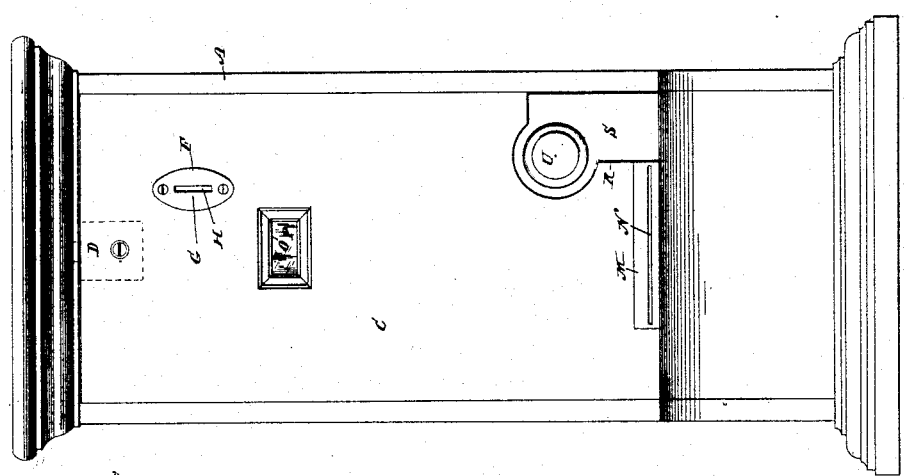
Witnesses:
Chas. B. Shumway
Edwd H Rogers
Inventor
John C. Stevens
By Geo. Seymour
Atty (No Model.) 7 Sheets—Sheet 2.

J. C. STEVENS.
AUTOMATIC VENDING MACHINE.

No. 412,993. Patented Oct. 15, 1889.

Witnesses:
Chas. B. Shumway
Edwd H. Rogers

Inventor
John C. Stevens
By Geo. Seymour.
Atty.

(No Model.) 7 Sheets—Sheet 3.
J. C. STEVENS.
AUTOMATIC VENDING MACHINE.

No. 412,993. Patented Oct. 15, 1889.

Witnesses:
Chas. B. Shumway
Edwd. H. Rogers

Inventor
John C. Stevens
By Geo. Seymour.
Atty.

(No Model.) 7 Sheets—Sheet 4.
J. C. STEVENS.
AUTOMATIC VENDING MACHINE.

No. 412,993. Patented Oct. 15, 1889.

Witnesses:
Chas. B. Shumway
Elliott Rogers

Inventor
John C. Stevens
By Geo. D. Seymour
Atty.

(No Model.)  7 Sheets—Sheet 5.
J. C. STEVENS.
AUTOMATIC VENDING MACHINE.
No. 412,993.  Patented Oct. 15, 1889.

Witnesses:

Inventor
John C. Stevens (No Model.) 7 Sheets—Sheet 6.

J. C. STEVENS.
AUTOMATIC VENDING MACHINE.

No. 412,993. Patented Oct. 15, 1889.

Witnesses:
Chas. B. Shumway
Edw. H. Rogers

Inventor
John C. Stevens
Geo. D. Seymour
By           Atty.

(No Model.)  7 Sheets—Sheet 7.
J. C. STEVENS.
AUTOMATIC VENDING MACHINE.
No. 412,993. Patented Oct. 15, 1889.
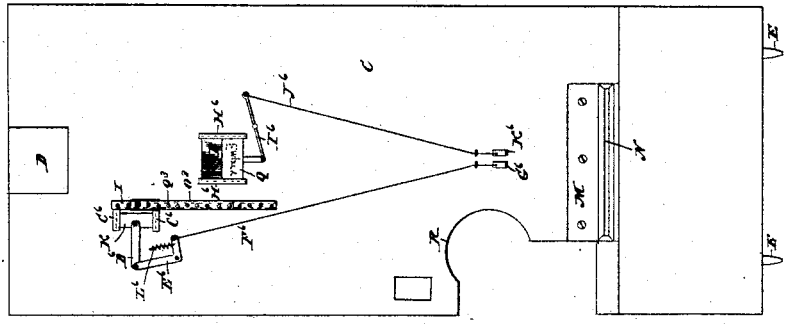
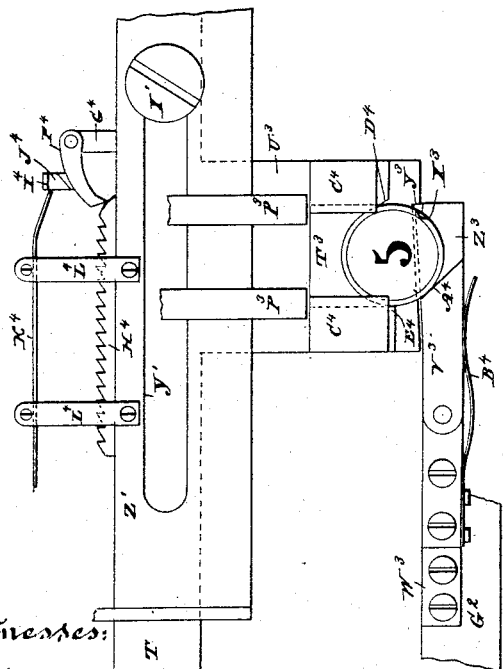
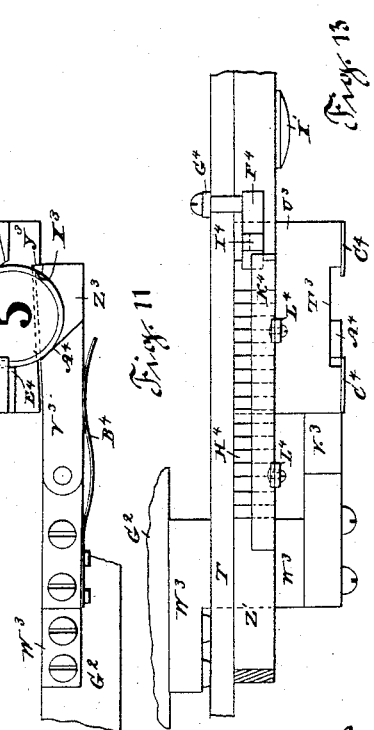
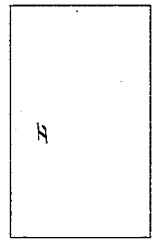
Witnesses:
Chas. B. Shumway
Edwd H Rogers
Inventor
John C. Stevens
By Geo. D. Seymour
Atty.

UNITED STATES PATENT OFFICE.

JOHN C. STEVENS, OF MOUNT VERNON, ASSIGNOR TO JOHN F. LOVEJOY, OF NEW YORK, N. Y.

AUTOMATIC VENDING-MACHINE.

SPECIFICATION forming part of Letters Patent No. 412,993, dated October 15, 1889.

Application filed December 13, 1888. Serial No. 293,469. (No model.)

*To all whom it may concern:*

Be it known that I, JOHN C. STEVENS, residing at Mount Vernon, in the county of Westchester and State of New York, have invented certain new and useful Improvements in Automatic Vending-Machines; and I do declare the following to be a full, clear, and exact description of the same, reference being had to the accompanying drawings, which form a part of this specification.

My invention relates to an improvement in automatic vending-machines which deliver small articles—such as tickets, post-cards, and packages—after the introduction into them of a coin, completing their organization as operative mechanism, the object of the present invention being to produce a machine of the character described which shall be simple in construction, durable in use, positive and reliable in operation, and practically impossible to operate except legitimately—that is, with a coin of a predetermined value.

Figure 3:
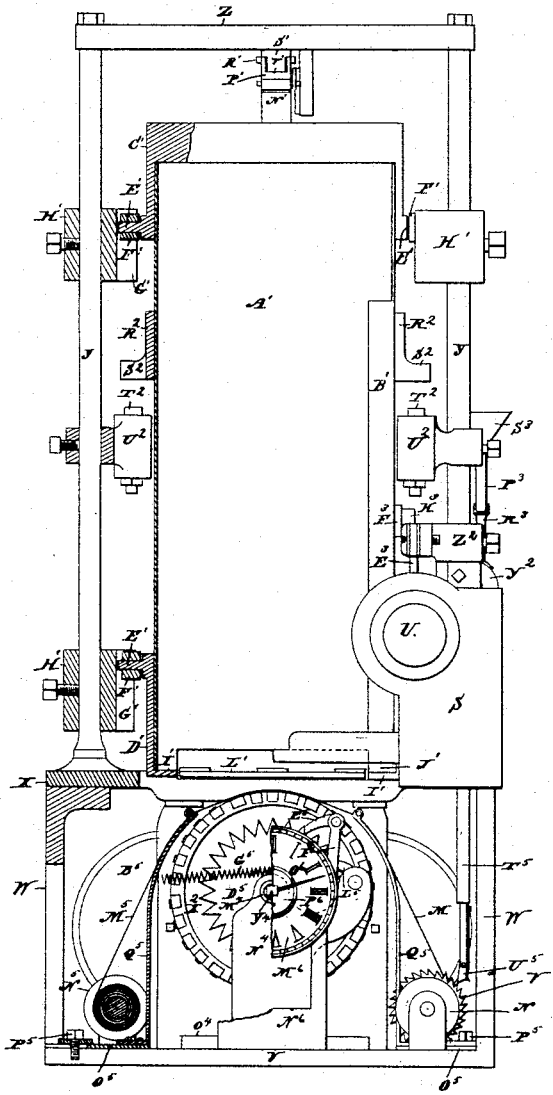
Figure 4:
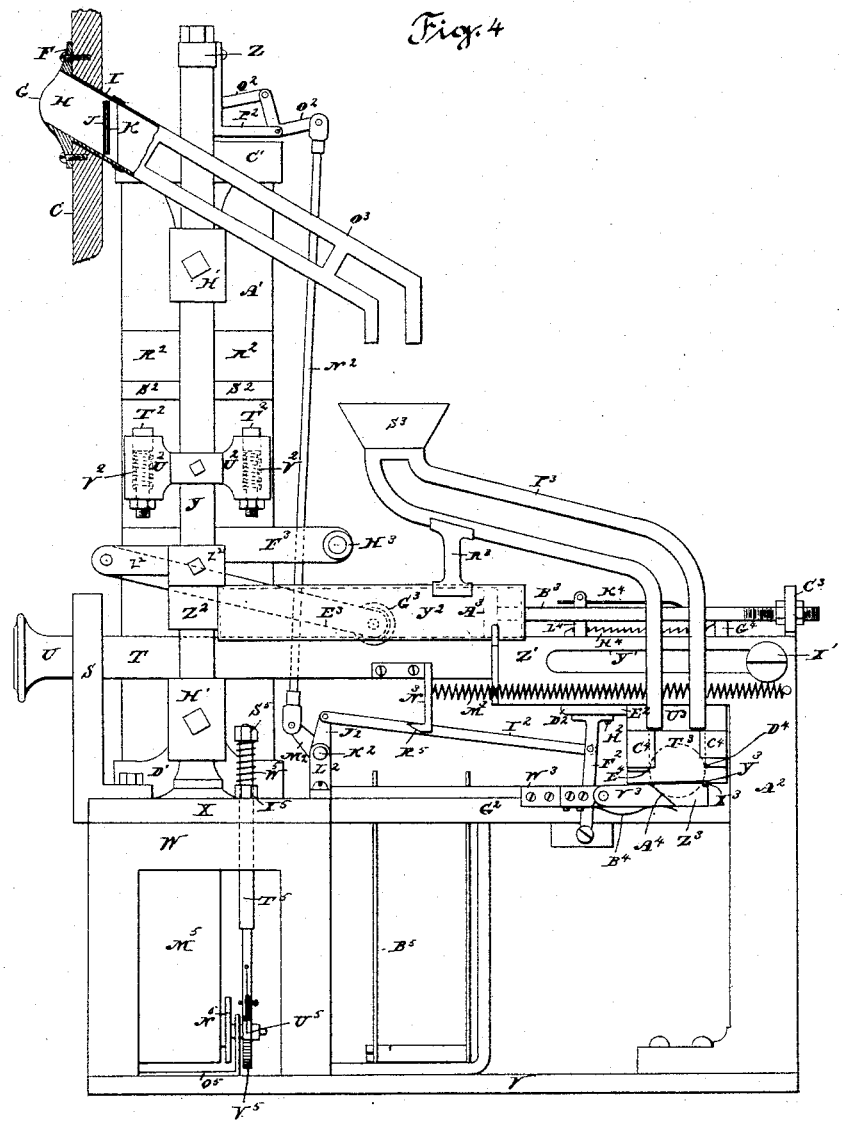
Figure 5:
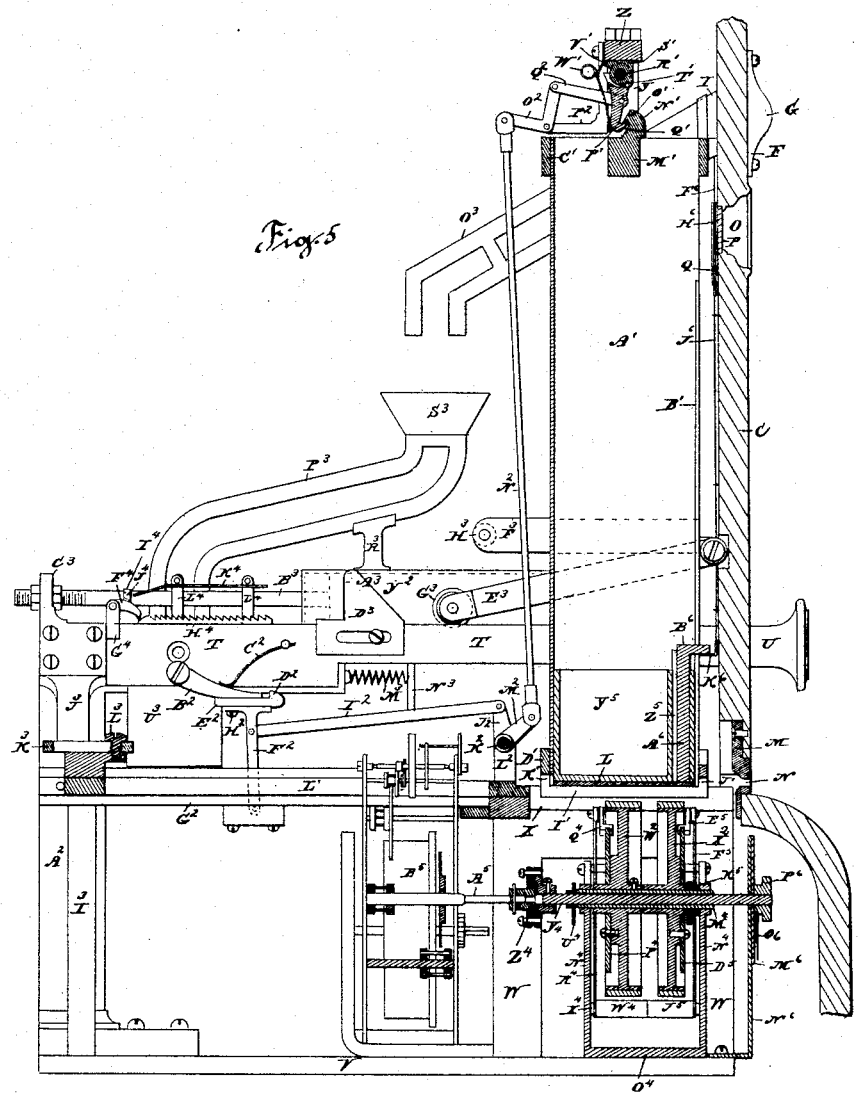
Figure 6:
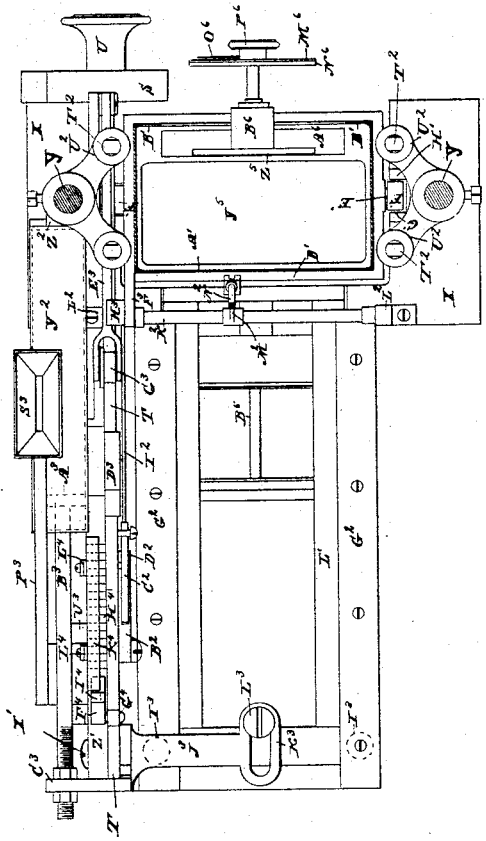
Figure 7:
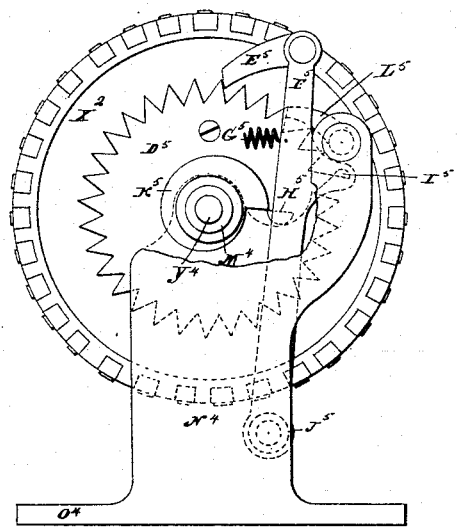
Figure 8:
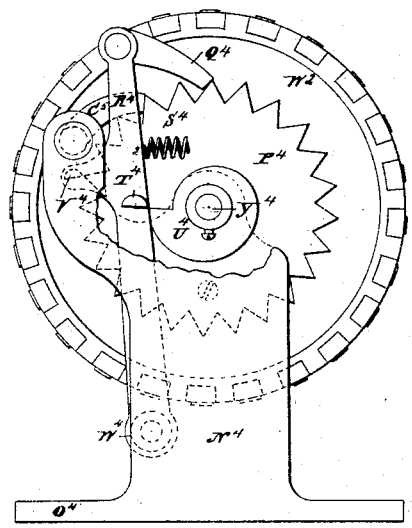
Figure 9:
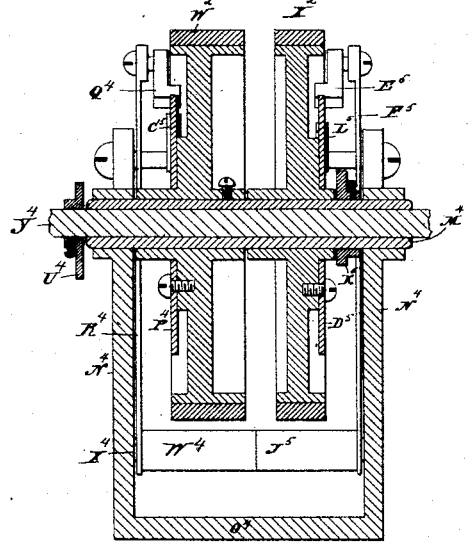

In the accompanying drawings, Figure 1 is a view in front elevation of a machine embodying my invention. Fig. 2 is a view thereof in side elevation. Fig. 3 is a view, partly in section and partly in front elevation, of the mechanism of the machine drawn to a larger scale and having the follower removed. Fig. 4 is a similar view showing the mechanism in side elevation looking toward the outside of the operating slide-bar and having the type-wheels and the frame supporting them removed. Fig. 5 is a similar view looking toward the inside of the lever with the inking-ribbon and its adjuncts removed. Fig. 6 is a plan view of the mechanism. Fig. 7 is a detached view in front elevation of the type-wheels, which are shown in full size. Fig. 8 is a rear view thereof. Fig. 9 is a view thereof in vertical section with the ends of the operating-shaft broken away. Fig. 10 is a broken view, in side elevation, of the unlocking mechanism and the safety mechanism drawn in full size. Fig. 11 is a similar plan view of the same features. Fig. 12 is a detached inside view of the removable door or panel of the case drawn to the scale of Figs. 1 and 2; and Fig. 13 is an outline of one of the tickets, such as are used with the device.

The mechanism of my improved device is inclosed in a case A, having a door B on one of its sides for the removal of the accumulated coins and a removable front door or panel C for access into its interior. This panel is provided at its upper end with a lock D and at its lower end with dowel-pins E, (see Fig. 12,) whereby it is secured in its place. An escutcheon or plate F set into an opening made in the upper right-hand corner of the door has a raised center or boss G formed upon its outer face. The vertical coin-slot H is formed in such boss and adapted in its diameter to permit the largest coin of the denomination selected for the machine to pass through it, the upper and lower walls of the slot being inclined. A hollow flattened shank I, (see Fig. 4,) inclosing an opening corresponding to the dimensions of the slot, is connected with the rear face of the said plate on a downward pitch and provided with a transverse slot J, receiving a slide K, (see Fig. 12,) operated, as will be described hereinafter, to prevent the introduction of coins into the slot after the machine has been exhausted of its stock of tickets L, (see Figs. 5 and 13,) or whatever may be substituted for them. A plate M, set into an opening formed below the center of the panel, is provided with a horizontal ticket-slot N, conformed to the length and thickness of the tickets which are to be delivered through it. An indicator-opening O, formed in the upper end of the panel and closed with a glass P, is provided for the display of an indicating-slide Q, (see Fig. 12,) which is thrown up and exposed through the opening when the tickets are exhausted, as will be described later on. The said panel is also cut away, as at R, (see Figs. 1 and 12,) to fit around a heavy plate or frame S, forming a bearing for the outer end of the horizontal operating slide-bar T and a buffer for the operating-knob U, which is attached to such end of the operating slide-bar. So much for the construction of the case and its removable panel.

The mechanism of the device is for the most part secured to a base V, located within the said case and provided at its forward end with two upright frames W W, each supporting a horizontal frame-plate X. Upright rods Y Y, respectively secured to such frame-plates, are united at their upper ends by a cross-beam Z. The ticket holder or tube A' is normally suspended from such beam between the rods, which, with the beam, form a frame inclosing it. This holder is made of light sheet metal, and is open at its upper and lower ends, closed at its back and sides, and open in front, where it is provided with metallic flanges B' B', which hold the tickets in place. Heads C' and D', respectively located at the upper and lower ends of the holder, are each provided at each end with a stud E' and roller F', extending into vertical slots G', formed in guides H', of which there is one located at the upper end and one at the lower end of each of the upright rods. Under this construction the holder is guided in its vertical movement both at its upper and lower ends. The head D', located at the lower end of the holder and stiffening the same, is provided at each end with an inwardly-projecting flange I', such flanges supporting the column of tickets in the holder. The said head is also provided at each end with a horizontal slot J', through which the tickets are delivered. An opening K', formed in the back of the said head and in line with the said slots, is provided for the delivery-slide L' to play in. The head C', located at the upper end of the holder and stiffening the same, has a cross-bar M', (see Fig. 5,) carrying a rigid hook N', having its rear edge undercut and provided with a bevel O'.

The suspension mechanism by which the holder is detachably connected with the beam Z is as follows: A swinging hook P', coacting with the hook N' and having a corresponding bevel Q', is suspended by a horizontal pin R' from a hanger S', depending from the cross-beam Z and having a stop-finger T' and a stop-shoulder V' for limiting its swinging movement. A spring W', also secured to the said beam, operates to constantly push the swinging hook forward. By making the holder of sheet metal, as described, it retains its shape, while the wooden holders heretofore employed warp and pinch the tickets.

The operating slide-bar T, before mentioned, is provided at its rear end and upon its outer face with a screw-stud X', which plays in a horizontal slot Y', formed in the horizontal arm Z' of an upright $A^2$, secured to the rear end of the base V of the machine, whereby the rear end of the operating slide-bar is supported and guided. A horizontal pawl $B^2$, to be called the "tripping-pawl," pivoted to the inner face of the operating slide-bar, is engaged by a spring $C^2$ with a rocking trip having a nose $D^2$ at its forward end and a horizontal rearwardly-extending tail $E^2$, such nose and tail being made in one piece and secured to an upright stem $F^2$, pivoted to the adjacent edge of the horizontal bed $G^2$ of the delivery-slide L'. A screw $H^2$, located in the said stem and engaging with the tail of the trip, is provided for adjusting it vertically and so timing its action. The stem $F^2$ of the said trip is connected with the hook P' by a long link $I^2$, pivoted to the stem, a rock-arm $J^2$, having the forward end of the link connected with it, a rock-shaft $K^2$, mounted in bearings $L^2$ $L^2$, located back of the ticket-holder and carrying the said rock-arm, a rock-arm $M^2$, also carried by the shaft, a long connecting-rod $N^2$, located back of the ticket-holder and connected at its lower end with the arm $M^2$, a bell-crank lever $O^2$, pivoted to a hanger $P^2$, depending from the beam Z and having the upper end of the rod $N^2$ connected with it, and a link $Q^2$, also connected with the lever $O^2$ and with the swinging hook P', whereby such hook is connected with the trip and through the same and the pawl with the operating slide-bar. Normally the toe of the pawl $B^2$ stands a little back of the nose $D^2$ of the trip, so as to permit the operating slide-bar T to be pulled out a trifle before the pawl begins to act on the trip. Then, when the pawl and trip are engaged, the pawl, moving forward with the operating slide-bar, rocks the trip, the motion so secured being transmitted through the parts $I^2$, $J^2$, $K^2$, $M^2$, $N^2$, $O^2$, and $Q^2$, just above described, to the swinging hook P', which is pulled back and out of engagement with the rigid hook N', thus permitting the ticket-holder to drop. As the trip is rocked, as described, its tail is elevated, with the effect of lifting the forward end of the pawl above the nose $D^2$ of the trip, which the pawl then clears in the outward movement of the operating slide-bar, to which the pawl is pivoted. Buffer-heads $R^2$ $R^2$ are respectively secured to the opposite sides of the ticket-holder, each having two outwardly-projecting horizontal lugs $S^2$, located adjacent to the forward and rear edges thereof. The said lugs engage, when the holder drops, with buffers, consisting of buffer-pins $T^2$, of which there is one for each lug, buffer-frames $U^2$ $U^2$, respectively secured to the upright rods Y Y, vertically adjustable thereupon and chambered to receive the said pins, and of springs $V^2$, encircling the buffer-pins. By thus locating a buffing device virtually at each corner of the holder the same is prevented from canting and straining when it drops, and, furthermore, the right presentation of the tickets to the type-wheels $W^2$ and $X^2$ is secured. From this results clean and clear printing of the tickets. A horizontal air-compression cylinder $Y^2$ is secured at its forward end to a head $Z^2$, mounted on the rod Y adjacent to the operating slide-bar, with which the cylinder is parallel. A piston $A^3$, located in the cylinder, is mounted upon a piston-rod $B^3$, the rear end of which is adjustably connected with an arm $C^3$, offsetting from the said operating slide-bar, whereby when the operating slide-bar is drawn out the piston is forced into the tube, with the effect of compressing the air therein. This body of compressed air prevents the operating slide-bar from being drawn out with a jerk, and hence not only avoids racking of the machine, but also secures time for the other parts thereof to operate. The ticket-holder is raised after being dropped by the operating slide-bar acting through a lifting-cam $D^3$ upon suitable lifting mechanism, consisting, preferably, of a pivotal lifting-arm $E^3$ and a rigid lifting-arm $F^3$. The said cam is adjustably secured to the lever at a point thereon in front of the pawl $B^2$, which begins to operate before the cam does. The arm $E^3$ is pivoted at its forward end to an arm or extension forming a part of the head $Z^2$, before mentioned, and extends horizontally over the operating slide-bar, being provided at its rear end with an anti-friction roller $G^3$. The arm $F^3$ is rigidly secured to the adjacent side of the ticket-holder and extends rearward over the pivotal arm, being provided at its rear end with an anti-friction roller $H^3$. Normally—that is, when the ticket-holder is suspended from the beam $Z$—the roller $G^2$ of the pivotal arm $E^3$ rides upon the edge of the operating slide-bar at a point thereon in front of the cam, while the arm $F^3$ and its roller $H^3$ are lifted clear above the pivotal arm and its roller. When, however, the ticket-holder is dropped, the roller $D^3$ rides upon the upper edge of the pivotal arm. Then as the operating slide-bar is pulled forward the cam $D^3$ moves under the roller $G^3$ and lifts the pivotal lever, which in turn lifts the rigid arm $F^3$, and hence the ticket-holder. As the same is lifted, the bevel of the rigid hook $N'$ engages with the bevel of the swinging hook $P'$, which is pushed back until the rigid hook has passed sufficiently above the swinging hook for the latter to be engaged with the former, whereby the ticket-holder is held in suspension from the beam.

The delivery-slide $L'$, successively separating the tickets from the column or series in the holder and reciprocated by the operating slide-bar, is mounted upon a bed $G^2$, supported at its forward end upon the rear edges of the frame-plates $X$ $X$ and at its rear end upon the posts $I^3 I^3$, secured to the base $V$ of the machine. The operating slide-bar and slide are coupled together by means of an arm $J^3$, secured to the extreme inner end of the former, extending over the bed, and provided with an open-link $K^3$, having its longest axis in line with the slide, and of a screw-stud $L^3$, passing through such link and secured to the extreme inner end of the slide. Normally the stud is located at the forward end of the link, which permits the operating slide-bar to be pulled out for a distance represented by the length thereof before the operating slide-bar begins to move the slide forward. The operating slide-bar, which, as has been explained, is manually drawn out, is retracted by a spiral spring $M^3$, connected at its rear end with the standard $A^2$ and at its forward end with an arm $N^3$, offsetting from the outer face of the operating slide-bar.

A coin chute or train (see Figs. 4 and 6) is provided for conducting the coins introduced through the coin-slot to the unlocking mechanism of the machine. This coin-chute is composed, as herein shown, of two members or parts $O^3$ and $P^3$, of which the former is secured at its upper end to the shank I, connected with the inner face of the plate F, in which the coin-slot H is formed, and at its lower end turned sharply downward to form such an angle as will prevent any picking-instrument from following the chute down to the unlocking device. The upper edge of the said part $O^3$ is provided with perforations $Q^3$ (see Fig. 12) to receive any wires that may be pushed into the chute through the coin-slot with the intention of operating the unlocking device. The part $P^3$ of the chute is supported by a bracket $R^3$, secured to the air-compression cylinder $Y^2$, and provided at its upper end with a funnel $S^3$, located directly below the angled lower end of the other part of the chute. The lower end of the part $P^3$ of the chute is bent downward and inclined inward to discharge the coins edgewise into a coin-recess $T^3$, formed in the outer face of an arm $U^3$, connected with the lower edge of the operating slide-bar and extending under the arm $Z'$, before described. The said parts of the chute are made of sheet metal and flattened in general outline and inclose an opening in which a five-cent nickel may freely run on its edge. By thus making the chute in two parts it becomes practically impossible to unlock the unlocking device located at its lower end, any picking instrument miscarrying before it reaches such device.

The unlocking device consists, essentially, of the arm $U^3$, before mentioned, and a horizontal unlocking-pawl $V^3$, located directly under the outer end of the said arm, pivoted at its outer end to a block $W^3$, secured to the adjacent outer edge of the bed $G^2$, provided at its forward end with a nose $X^3$, normally standing a short distance—say the sixteenth of an inch—in front of the shoulder $Y^3$, formed on the lower face of the arm, with a recess $Z^3$, open at its rear end, located in its outer face and below and in line with the recess $T^3$ aforesaid, and with a bevel $A^4$, located in the forward end of such recess. A spring $B^4$, engaging with the lower face of the pawl and secured to the block $W^3$ aforesaid, normally holds the pawl in an elevated position, in which its nose $X^3$ stands in front of the shoulder $Y^3$, as described, and in which it partially closes the lower end of the coin-recess.

Two small plates $C^4$ $C^4$, secured to the arm $U^3$, are provided for preventing the coins from jumping out of the recess $T^3$ therein. The said recess is slightly wider than the diameter of the coin and slightly deeper than the thickness thereof, so that the coin will move freely in it. The inner edge of the lower end of the rear wall of the recess is shaped to form a bevel $D^4$, while the corresponding edge of the forward wall of the recess is shaped to form a sharp corner $E^4$, as shown. The arm and pawl are also constructed so that when the pawl is in its normal or elevated position the opening between the bevel $D^4$ and the bevel $A^4$ will be too small for the coin to which the machine is set to pass through, so that the coin will be supported upon the bevel $A^4$ of the pawl; but a small coin—such as a penny—will readily pass through the opening. When the pawl is supporting a coin, as described, and the operating slide-bar is pulled forward, the coin will be depressed edgewise and ride down under the bevel $D^4$, turning on the sharp corner $E^4$. The depression of the coin pushes the pawl downward, and therefore sufficiently widens the opening between the bevels $A^4$ and $D^4$ to permit the coin to pass between such points, after which the pawl is snapped back or lifted by its spring $Z^3$; but the forward movement of the operating slide-bar and the depression and elevation of the pawl are timed so that the shoulder $Y^3$ will pass in front of the nose $X^3$ of the pawl before the latter is snapped back by the spring, wherefore the arm $S^3$ is permitted to ride over the pawl and the operating slide-bar to be pulled out to complete its forward movement. When the operating slide-bar is retracted by the spring $M^3$, the arm $U^3$ rides over the pawl and pushes the same down until the shoulder $Y^3$ passes back of the nose $X^3$, when the pawl is lifted to its normal position again by its spring. If now the operating slide-bar is pulled forward without first introducing a five-cent nickel into the machine, the shoulder will after a very slight forward movement of the operating slide-bar engage with the nose of the pawl, which will prevent the operating slide-bar from being pulled out any farther, and so lock the machine. The action of the unlocking device is virtually to snap the coin by its smooth edges and positively move it to do the work of unlocking the machine, whereas in earlier machines of this type the coins have been used as idle couplers between two movable parts and incidentally tipped flatwise.

It will be noted that after the coin in my device has done its work the pawl snaps back and reduces the opening between the two bevels to its normal width, so that the coin cannot be pulled above the pawl again. This prevents the utilization of the same coin to successively unlock the machine by an expedient which will be obvious from the foregoing passage to those familiar with this class of devices.

To the end that the operating slide-bar may not be drawn forward more than once after it has been unlocked by a coin, a gravity safety-pawl $F^4$ is pivoted to an ear $G^4$, rising up from a point near its rear end and normally standing behind a rack $H^4$, secured to the upper edge of the fixed arm $Z'$, which supports the rear end of the operating slide-bar. The said pawl is provided upon its upper edge with a finger $I^4$, having an opening $J^4$, receiving a rail $K^4$, supported above the rack by posts $L^4$ $L^4$, standing up from the said arm $Z'$. The rear end of this rail is bent downward to stand directly in front of the opening in the finger of the pawl when the same is in its normal position behind the rack. When under this construction the operating slide-bar is pulled forward, the rail picks up the pawl through the finger thereof and holds it above the rack, and finally drops in front of the same. Now, when the operating slide-bar is retracted, the pawl rides over the rack and is finally left standing behind the rear end thereof; but in case the operating slide-bar is allowed to go back only part way in an attempt to secure the delivery of another ticket the pawl promptly engages with the rack and prevents such movement of the operating slide-bar. To prevent the pawl from so engaging with the rack, the operating slide-bar must be allowed to go the limit of its instroke and so carry the pawl into position for the engagement of its finger by the elevated rail; but when the operating slide-bar is allowed to go back far enough to effect this purpose it is locked by the unlocking-pawl, which then takes the place of the gravity-pawl in preventing the illegitimate forward movement of the operating slide-bar.

The type-wheels $W^2$ and $X^2$, for dating the tickets, are mounted directly below the open lower end of the ticket-holder upon a horizontal sleeve $M^4$, supported at its rear and forward ends in the sides $N^4$ of a frame $O^4$, secured to the base $V$ of the machine at a point between the frames $W$ $W$, before mentioned. The wheel $W^2$, which is the hour-wheel and carries the type to print the hours, is rigidly secured to the rear end of such sleeve and provided upon its rear face (see Fig. 8) with a rigid spur-wheel $P^4$ of twenty-four teeth. A pawl $Q^4$, having a beveled nose engaging with the teeth of such wheel, is pivoted to the upper end of an oscillating lever $R^4$, operated in its effective stroke by a spring $S^4$, connected with it and any other suitable point, and provided with a pin $T^4$, engaged by a driven snail-cam $U^4$ with a stop $V^4$, engaging with the teeth of the wheel to limit the forward movement thereof, and with a tubular inwardly-projecting bearing $W^4$, located at its lower end and receiving a shaft $X^4$, extending between the sides $N^4$ of the frame $O^4$. The said snail-cam $U^4$ is mounted upon a shaft $Y^4$, extending through the sleeve and frictionally coupled at its rear end by a friction-head $Z^4$ with an extended center arbor $A^5$ of an ordinary clock-movement $B^5$, located behind the frame $O^4$, and wound from the front of the case by a long key when the panel $C$ is out. This is a very convenient mode of winding the clock-movement and avoids the use of a special opening in the case for the clock-key and the use of bevel-gearing on the winding-arbor.

By mounting the type-wheels upon a sleeve, as described, the shock of the falling ticket-holder with its load of tickets is taken from the shaft, which is thus prevented from being bent, the sleeve being made heavy enough to stand the strain. A stop-pawl $C^5$, located behind the pawl $Q^4$, is provided for engaging with the teeth of the wheel $P^4$ to prevent the same from being dragged back by the cam $U^4$. The wheel $X^2$, which carries the type to print the day of the month, is loosely mounted upon the forward end of the sleeve $M^4$ and provided upon its front face (see Fig. 7) with a spur-wheel $D^5$ of thirty-one teeth. A pawl $E^5$, having a beveled nose engaging with the teeth of the said wheel $D^5$, is pivoted to the upper end of an oscillating lever $F^5$, operated in its effective stroke by a spring $G^5$, and provided with a pin $H^5$, a stop $I^5$, and a bearing $J^5$, corresponding to the pin $T^4$, stop $V^4$, and bearing $W^4$ of the lever $R^4$. The said pin $H^5$ is engaged by a snail-cam $K^5$, mounted upon the forward end of the sleeve $M^4$, which is rotated once in twenty-four hours by the clock-movement, and therefore shifts the wheel $X^2$ once a day through the said snail-cam $K^5$. A stop-pawl $L^5$, corresponding to the pawl $C^5$, is provided for preventing the wheel $X^2$ from being dragged back by the pawl $E^5$.

The inking-ribbon $M^5$, which passes over the type-wheels $W^2$ and $X^2$, has its opposite ends wound upon spools $N^5$, respectively located upon opposite sides of the said wheels and mounted in frames $O^5$ $O^5$, each slotted to receive a bolt $P^5$, removably securing them to the base V of the machine, whereby when it becomes necessary to replace or reink the ribbon it may be done readily and without disturbing any other part of the machine by simply loosening the said bolts and detaching the frames from the said base. Long fingers $Q^5$ $Q^5$, respectively located on opposite sides of the wheels and secured to the inner edges of the frames, are provided for preventing the ribbon from dragging on the wheels. The ribbon is shifted every time a ticket is printed, in order to present a new printing-surface to the next ticket, by means of the operating slide-bar, the arm $N^3$ whereof is provided at its outer end with a beveled foot $R^5$, which engages, when the operating slide-bar is pulled out, with a nut $S^5$, located at the upper end of a shaft $T^5$, mounted for vertical movement in the adjacent frame-plate W and carrying at its lower end a spring-actuated pawl $U^5$, adapted to engage, when the shaft is depressed, with a ratchet-wheel $V^5$, mounted upon the inner end of the spindle of the adjacent spool. A spiral spring $W^5$, encircling the upper end of the shaft and interposed between the said nut $S^5$ and a nut $X^5$, resting upon the said frame-plate, is provided for holding the shaft in a normally-elevated position, in which its pawl is disengaged from the ratchet-wheel and its nut $S^5$ is in the path of the foot $R^5$, before mentioned. As the pawl is normally disengaged from the ratchet-wheel, the spools are normally free to be rotated in either direction, so that the ribbon may be wound from one to the other, as desired.

A heavy rectangular follower $Y^5$, adapted to be inserted into the ticket-holder over the upper ends of the flanges $B'$ $B'$ thereof, rests upon the column of tickets and follows them down to insure their right and sure feeding. This follower is provided with a vertical passage $Z^5$, receiving a weight $A^6$, the lower end whereof normally rests on the uppermost ticket, while its upper end stands above the upper face of the follower and is furnished with an outwardly-projecting ear $B^6$.

The slides K and Q, before referred to, are operated by the said weight $B^6$ to respectively obstruct the coin-chute and to display the word "Empty" on the slide Q through the opening O in the panel. To this end the slide K, which plays between guides $C^6$ $C^6$, secured to the back of the panel, is connected by a link $D^6$, lever $E^6$, and wire $F^6$ with a finger $G^6$, while the slide Q, which plays between guides $H^6$ $H^6$, is connected by a lever $I^6$ and a wire $J^6$ with a finger $K^6$. The said fingers are arranged so that when the follower, and hence the weight, is resting on the last ticket in the holder the ear $B^6$ of the weight will engage with both of them. When this ticket is removed, the follower drops down upon the flanges $B'$ $B'$ of the head $D'$, located at the lower end of the holder. The removal of the ticket leaves, however, no support for the weight, which accordingly drops down through the follower until its ear $B^6$ engages with the upper face thereof. As the weight drops it pulls down the fingers $G^6$ and $K^6$ and operates the slides, as described. When the follower, and hence the weight, is lifted again, the slide Q drops backs by gravity into obscurity, while a spring $L^6$ is employed to pull the slide K back to clear the coin-slot.

A dial $M^6$, secured to a frame $N^6$, attached to the base V, is provided for setting the clock-movement, and is thereto swept by a pointer $O^6$, attached to the extreme forward end of the shaft $Y^4$, which also carries a thumb-nut $P^6$, whereby the pointer is set.

Having now described the construction and functions of the several features of my improved machine, I will briefly set forth their operation in due order. A nickel being pushed into the coin-slot rolls on its edge through the upper part of the chute and drops from the lower end thereof into the upper end of the lower part of the chute, which transmits it to the coin-recess, where it is arrested by the unlocking-pawl, upon the bevel whereof it is supported. The operating-knob is now seized and the operating slide-bar pulled out. This brings an endwise pressure upon the coin, which pushes the pawl out of the way to permit the operating slide-bar to be pulled forward. In the forward movement of the operating slide-bar the toe of the horizontal tripping-pawl engages with the nose of the trip and rocks the same forward and pulls the swinging suspension-hook out of engagement with the rigid hook at the upper end of the ticket-holder, which then drops and impacts the undermost ticket of its series upon the uppermost type in the type-wheels. As the trip is rocked forward its tail is elevated and lifts the toe of the tripping-pawl out of engagement with its nose, whereby the pawl rides over the trip, which, being thus released, is at once restored to its normal position by the spring engaging with the swinging hook and acting through the connections between the trip and such hook, which is swung back into position for engagement with the hook of the ticket-holder. As the holder drops it is cushioned in its fall by the four buffers, which are virtually located at its four corners. The operating slide-bar still being pulled out, the adjustable lifting-cam moves under the pivotal lifting-arm and lifts it against the rigid lifting-arm and so lifts the ticket-holder, causing the bevel of the rigid hook to engage with the bevel of the swinging hook, the latter being pushed back and then re-engaged by its spring with the rigid hook, whereby the said holder is suspended again. The delivery-slide is now positively coupled with the operating slide-bar and moved forward to enter the opening in the back of the ticket-holder and engage its forward edge with the undermost ticket therein, which it separates from its fellows and delivers through the delivery-slot in the panel.

It may be remarked here that the entire forward movement of the operating slide-bar above described has been controlled by the column of compressed air in the compression-cylinder, the first movement of the operating slide-bar beginning the compression of the air therein. The final purpose of the machine having now been fulfilled in the delivery of the ticket, the operating-knob is released. When this is done, the operating slide-bar is at once pulled back by its retracting-spring. As it goes back its pivotal lifting-arm rides over the lifting-cam and down in front of the same, the delivery-slide is retracted and left in its normal position, the tripping-pawl rides over the trip and takes its place behind the nose thereof, and finally the unlocking-pawl snaps back and locks the operating slide-bar again.

The incidental functions of the gravity safety-pawl need not be further described than they have been in connection with the description of such pawl and its adjuncts.

The specific advantages flowing from the several features of my improvement have been set forth in the body of the description and need not be repeated here.

As an organization my improved machine is positive and reliable in its action and will not get out of order.

It is apparent that my invention may be applied to other vending-machines than those for delivering tickets. I would therefore have it understood that I do not limit myself to the exact construction and combinations of parts herein shown and described, but hold myself at liberty to make such changes and alterations as fairly fall within the spirit and scope of my invention.

Having fully described my invention, what I claim as new, and desire to secure by Letters Patent, is—

1. In an automatic vending-machine, the combination, with a vertically-movable holder, of a hook secured to the upper end thereof, a swinging hook for engagement with the holder-hook, an operating slide-bar for operating the machine, and connection between such swinging hook and slide-bar, substantially as set forth.

2. In an automatic vending-machine, the combination, with a vertically-movable holder, of a hook secured to the upper end thereof, a swinging hook for engagement with the holder-hook, an operating slide-bar, and connections between the swinging hook and operating slide-bar, including links, a bell-crank lever, a rock-shaft carrying rock-arms, and a long connecting-rod, substantially as set forth.

3. The combination, with a trip having a nose and tail and adapted to be moved so as to depress its nose and elevate its tail, of an adjusting device—such as the screw $H^2$—operating-connections attached to the trip, a pawl engaging with the nose and tail of the trip, and a movable part carrying the pawl, whereby when such part is moved the pawl positively moves the trip, which frees itself from the pawl by its tail, substantially as set forth.

4. In an automatic vending-machine, the combination, with a vertically-movable holder, of an operating-lever and an adjustable cam carried by such operating slide-bar for lifting the holder, substantially as set forth.

5. In an automatic vending-machine, the combination, with a vertically-movable holder, of an operating slide-bar, a cam carried thereby, and a pivotal arm engaged by such cam and connected with the holder to lift the same, substantially as set forth.

6. The combination, with a vertically-movable holder, of suspension mechanism, substantially as described, located at the upper end thereof and to which the holder is detachably connected, lifting mechanism, substantially as described, connected with the holder, an operating slide-bar connected with both the said mechanisms and adapted to detach and drop the holder and to restore it to its raised position, uprights located on opposite sides of the holder, and guides mounted on the said uprights and receiving guiding-extensions carried by the holder, substantially as described.

7. In an automatic vending-machine, the combination, with a vertically-movable tubular holder adapted to contain and deliver singly a series of articles to be vended, of uprights between which it is located, guides secured to such uprights for guiding the holder, buffers carried by the uprights, and buffer-heads secured to the holder on its opposite sides, substantially as set forth.

8. In an automatic vending-machine, the combination, with an operating slide-bar, of an unlocking-pawl, such operating slide-bar being adapted to positively move a coin edgewise, whereby the coin operates the pawl to unlock the operating slide-bar, substantially as set forth.

9. In an automatic vending-machine, the combination, with an operating slide-bar having a coin-recess, of a pawl normally locking the operating slide-bar and located below it, so as to partially close the lower end of its recess and support a coin therein until the coin is positively moved by the operating slide-bar to displace the pawl and unlock the operating slide-bar, substantially as set forth.

10. In an automatic vending-machine, the combination, with an operating slide-bar having a coin-recess, of a pawl normally locking the operating slide-bar and located below it, so as to partially close the lower end of its recess, and provided with a bevel, upon which the coin rests and against which it is pressed by the operating slide-bar to displace the pawl and so unlock the operating slide-bar, substantially as set forth.

11. In an automatic vending device, the combination, with an operating slide-bar, of a gravity safety-pawl carried thereby, a rigid rack for engagement by such pawl, and a rail having an incline at one end to lift the pawl above the rack in the normal forward movement of the operating slide-bar, substantially as set forth.

12. In an automatic vending mechanism, the combination, with a sleeve, of two wheels, one of which is rigid and the other loose thereupon, a driven shaft passing through the sleeve, a snail-cam secured to the shaft, an oscillating lever actuated by such cam for operating the rigid wheel, and hence rotating the sleeve, a snail-cam carried by the sleeve and rotating therewith, and an oscillating lever actuated by the cam last mentioned and actuating the loose wheel in rotation, substantially as set forth.

13. In an automatic vending-machine, the combination, with a vertically-movable holder adapted to carry a number of blanks, of two type-wheels, an inking-ribbon, two spools, respectively located on opposite sides of the wheels, spool-frames removably secured in place, a ratchet-wheel carried by the spindle of one of the spools, a pawl normally disengaged from such ratchet-wheel, and an operating slide-bar for operating the holder and actuating such pawl, substantially as set forth.

14. In an automatic vending device, the combination, with a case having an indicator-opening and a coin-slot, of an indicating-slide adapted to be displayed through such opening, a slide to obstruct the coin-slot, a holder, a follower located therein, a weight located in the follower, having a projecting ear and normally supported by the contents of the holder, fingers adapted to be engaged by the ear when the weight drops after the removal of the last article from the holder, and connections between such fingers and slides for operating the latter, substantially as set forth.

In testimony whereof I have signed this specification in the presence of two subscribing witnesses.

JOHN C. STEVENS.

Witnesses:
JOHN F. LOVEJOY,
GEO. D. SEYMOUR.